June 10, 1952 R. C. CROSSLEY 2,599,748
RECTIFIER COOLING ARRANGEMENT
Filed Dec. 29, 1949 2 SHEETS—SHEET 1

Inventor.
Richard C. Crossley.
By Schroeder, Merriam,
Hofgren & Brady.
Attorneys.

June 10, 1952   R. C. CROSSLEY   2,599,748
RECTIFIER COOLING ARRANGEMENT
Filed Dec. 29, 1949   2 SHEETS—SHEET 2
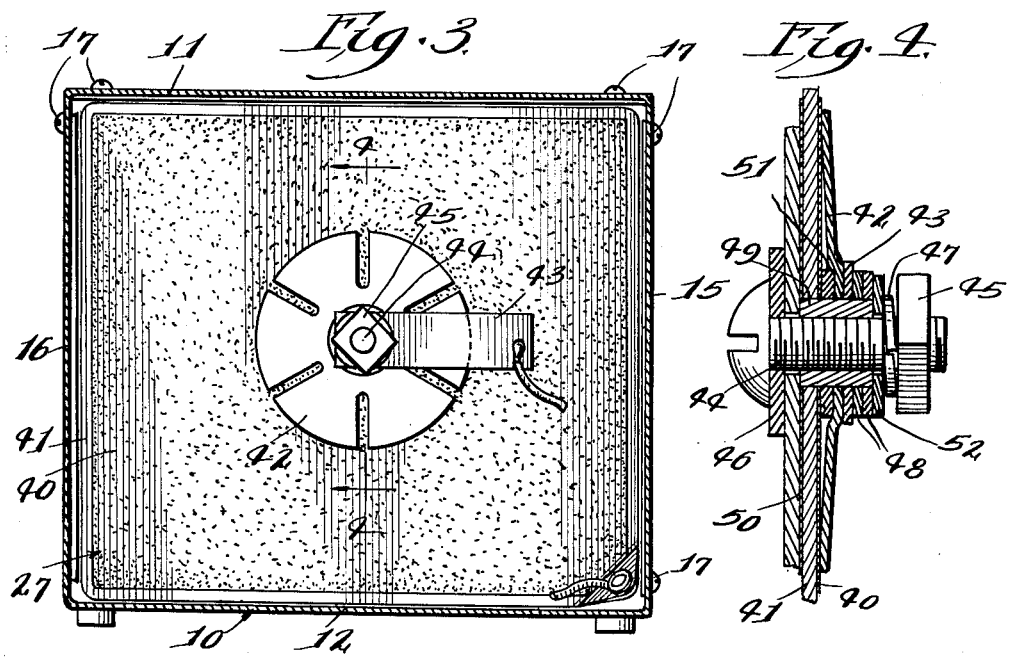
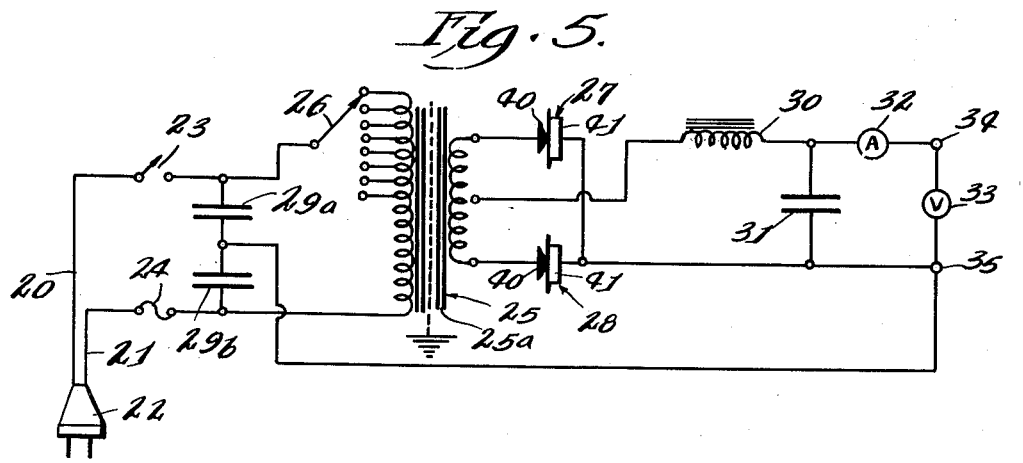
Inventor.
Richard C. Crossley.
By Schroeder, Merriam,
Hofgren & Brady.
Attorneys.

Patented June 10, 1952

2,599,748

UNITED STATES PATENT OFFICE 2,599,748

RECTIFIER COOLING ARRANGEMENT

Richard Cleary Crossley, Evanston, Ill., assignor to Electro Products Laboratories, Inc., a corporation of Illinois Application December 29, 1949, Serial No. 135,814

3 Claims. (Cl. 175—298)

This invention relates to a rectifier cooling arrangement, and more particularly to a cooling arrangement wherein the rectifier may be cooled by convection and conduction.

One feature of this invention is that it provides an improved rectifier cooling arrangement; another feature of the invention is that the rectifier is mounted on a wall of the holding means which mounts the electrical system, the rectifier being electrically insulated from the part of the holding means upon which it is mounted and having a large surface area in direct heat conductive relationship with said wall; another feature of the invention is that the wall upon which the rectifier is mounted has its outer surface exposed to open space; a further feature of the invention is that where the rectifier means includes two members, as in a full wave power supply unit, each member is mounted on a different wall of the casing which houses the unit; an additional feature of the invention is that if the rectifier means include two members, the members may be mounted upon opposite walls of the casing to take full advantage of the entire surface arrangement of the casing for cooling purposes; and still another feature of the invention is that the rectifier is in heat conductive contact with a wall of the casing throughout substantially the entire area of said wall.

Other features and advantages of this invention will be apparent from the following specification and from the drawings, in which:

Fig. 3 is a vertical sectional view along the line 3—3 of Fig. 1;

Fig. 4 is an enlarged fragmentary section along the line 4—4 of Fig. 3; and

Fig. 5 is a schematic wiring diagram of the power supply circuit.

Figure 1:
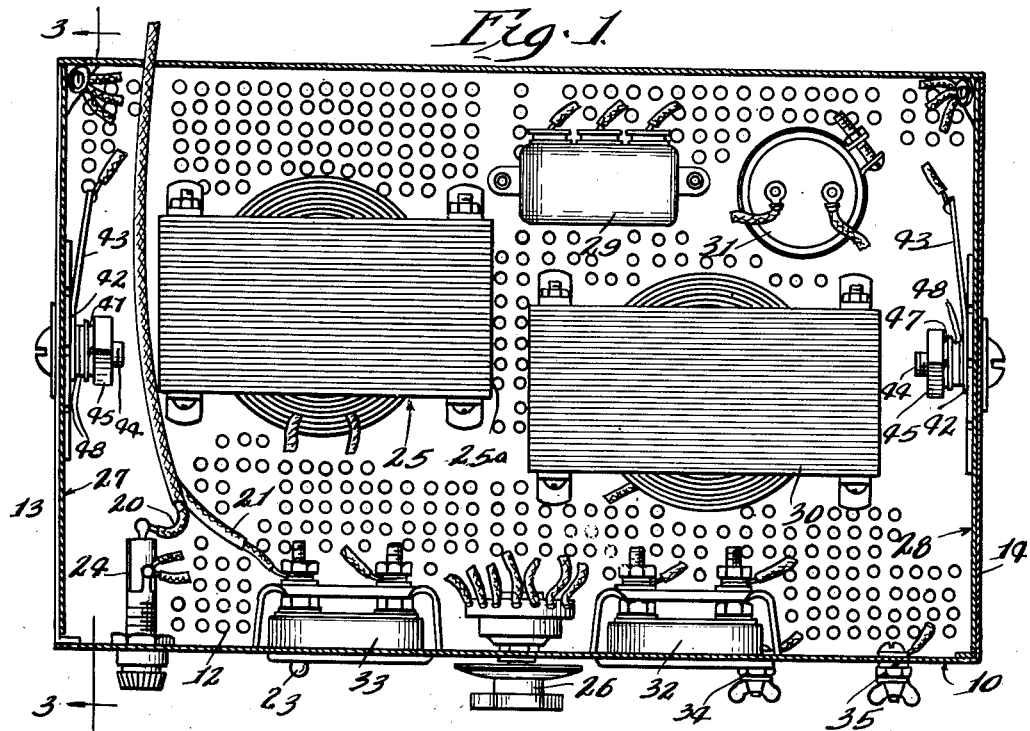
Fig. 1 is a horizontal sectional view through a power supply unit embodying the invention, the wiring being broken away and Fig. 1 being taken along line 1—1 of Fig. 2 and effectively being a top plan view with the cover removed.

In power supply units and other electric systems wherein rectifiers are used, dissipation of heat often becomes an important factor. It will be understood throughout this specification and the attached claims that the word "rectifier" refers to thin film types of rectifier, the most common examples being copper oxide and selenium rectifiers; and the word does not include vacuum tube or gas tube rectifiers so often found in high voltage circuits. Thin film rectifiers of this type operate on the principle that when a thin film of the rectifying element (as copper oxide or selenium) is formed upon a metallic conductive surface (as copper or iron) the resistance that the film offers is small for currents flowing in one direction and high for currents flowing the opposite way. It often happens that at least two rectifiers of this type are required in a circuit. Sometimes this is due to the electrical quantities involved, and in all full wave power supply units, of course, the rectifying means includes two alternatively operable members. In the past it has been the common practice to "stack" these different rectifying members, although some attempts have been made to separate the members and use the heat conductive qualities of other parts of the system for cooling purposes. These attempts have been subject to certain defects which are cured in the present invention. For example, in some cases a separate plate was mounted in the casing of the unit and one or more of the rectifier members was carried on this plate. While the plate was in heat conductive relationship with the rectifiers, the plate itself was within the casing or cabinet of the unit and consequently could not be cooled most efficiently by convection. Other attempts have been made to mount the rectifier directly on the casing so that the casing became a part of the electrical circuit, but such arrangements were defective because the wall of the casing upon which the rectifying members were mounted was not open to outer space, but was only open to a small closed compartment within the cabinet of the unit. In this specification and the claims attached hereto the words "open space" refer to space outside the power supply or other electric system where optimum convection cooling may be obtained, and do not include a small compartment within the cabinet of the unit, for example.

Thin film rectifiers of this type are normally rated for a certain current capacity under conventional cooling conditions where the rectifier is within a casing and is cooled only by convection currents flowing through the casing. For example, certain selenium rectifiers are normally rated at 14 amperes. These same rectifiers in an arrangement constructed in accordance with my invention can be operated with a current of at least 20 amperes to 25 amperes—or at least approximately 1½ to 2 times the normal rated current carrying capacity. In consequence, in a full wave power supply unit I am enabled to use only two rectifier members where normally four or even six such members would be required.

Referring now more particularly to the drawings, the invention is illustrated in a full wave power supply unit. The unit comprises a casing designated generally at 10 which acts as a holding means and houses the elements of the system. In the power supply unit illustrated the casing is formed of metal and has a top 11 with louvers 11a providing openings therethrough. The casing has a perforated bottom 12, the perforations in the bottom and the openings formed by the louvers in the top permitting air circulation from outside space. The casing is completed by end walls 13 and 14 and front and back walls 15 and 16 respectively. In the unit shown the top and back are removable as a unit, these walls being held in place by screws 17.

Figure 2:
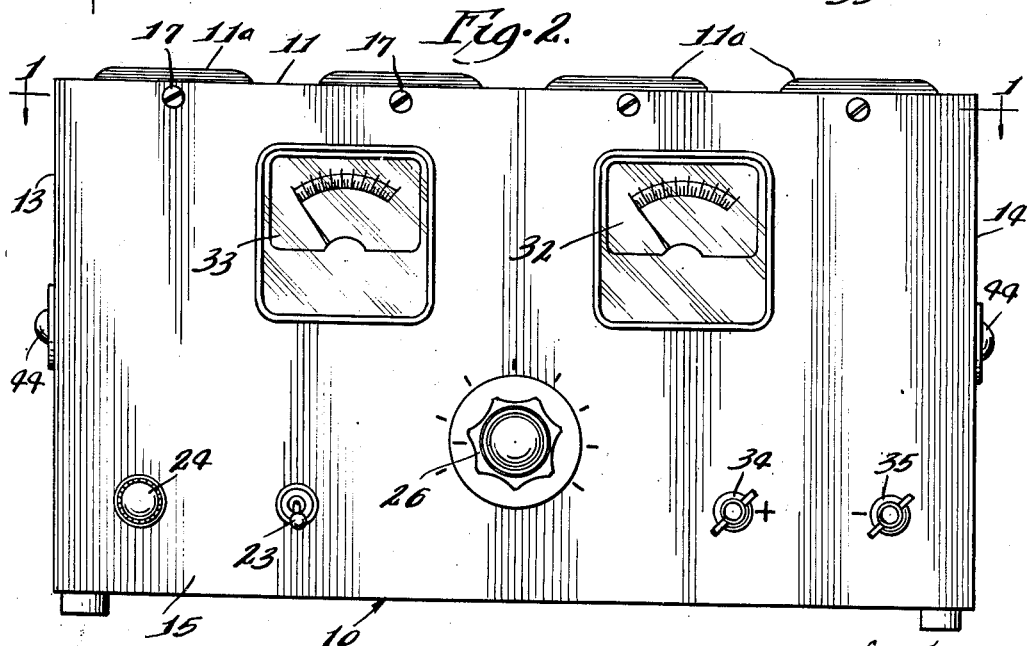
Fig. 2 is a front elevational view of the power supply unit.

Inasmuch as most of the specific elements of the power supply are not important to the invention they will not be described in detail but will be described only briefly, reference being had to Fig. 5, although the elements shown in Fig. 5 are also shown in Figs. 1 and 2. In Fig. 5 a conventional wall cord, having wires 20 and 21, has a conventional wall plug 22 at one end and extends into the unit. In order to operate the unit the wall plug may be plugged into a conventional wall socket leading to a commercial source of 110 volt alternating current, for example. The wire 20 is connected to an "off-on" switch 23 and the wire 21 is connected to a fuse 24, the other side of the fuse being connected to one end of the secondary of a transformer designated generally at 25. The primary of the transformer has a plurality of taps (eight as shown) for supplying different voltages, and any one of these taps may be selected by a switch 26 which is connected in series with the "off-on" switch 23. In the power supply unit shown the normal voltage output used in most instances is 6 volts, but the taps permit variations between three and nine volts. As shown in Fig. 1 the core 25a of the transformer is bolted to the chassis or casing 10, this being illustrated by a ground connection in Fig. 5. Each end of the secondary of the transformer 25 is connected to a rectifier member here designated generally as 27 and 28 respectively. The other side of these rectifiers are connected together (preferably by an insulated wire of suitable size) and returned to the midpoint of the input circuit, this return being completed by condensers 29a and 29b. These condensers are both contained within the unit 29 of Fig. 1. The common return just described couples the negative side of the rectifiers with the negative side of the input circuit.

The positive rectified voltage is obtained from a center tap on the transformer secondary, a filter choke 30 and a filter condenser 31 being provided in conventional manner. An ammeter 32 is connected in series in the positive voltage lead and a voltmeter 33 is connected across the positive and negative leads, and the rectified voltage may be obtained across positive terminal 34 and negative terminal 35.

The invention resides in the construction and arrangement of the rectifier members 27 and 28. As is known, in the operation of such a power supply the rectifiers develop heat, and the efficiency of dissipation of this heat determines to a large extent the efficiency of the unit and particularly the quantity of current which may be drawn without overloading the rectifiers. In the past it has been the normal practice to assemble the rectifier members 27 and 28 as a "stacked" unit—i. e., the rectifiers being mounted back to back within the casing. With this construction convection currents through the openings in the casing comprised almost the sole means of cooling the rectifiers, and the quantity of current which might be drawn from the unit without damaging the rectifiers was distinctly limited, 14 amperes being the recommended rating in a unit of the character described.

According to the present invention the alternatively operable members 27 and 28 of the rectifiers are mounted one on each of two opposite walls of the casing 10, these walls being exposed to open space and being of metal or other heat conductive material. Each rectifier is preferably electrically insulated from the wall upon which it is mounted and each member has a large surface area (preferably of substantially the same size as the end wall of the cabinet) in direct heat conductive relationship with the wall upon which it is mounted. This arrangement takes full advantage of the entire surface area of the casing for cooling the rectifiers. Mounting the rectifier members on opposite walls of the casing in heat conductive relationship with the walls ensures that heat is conducted from the rectifier members to the walls of the casing which have a very large dissipating area. Since at least the two opposite walls upon which the rectifier members are mounted are exposed to outside space (as opposed to facing into a chamber within a cabinet, for example) optimum convection cooling is obtained over the entire outside surface of the casing.

The means for mounting the rectifier members on opposite walls of the casing is disclosed in Fig. 1, Figs. 3 and 4 supplementing this disclosure. In Fig. 1 the rectifier member 27 is mounted on the wall 13 and the rectifier 28 is mounted on the wall 14. Inasmuch as the mounting of each member is similar, only one will be described and similar reference characters will be used for both. Each rectifier comprises a thin film 40 of selenium mounted on a metal backing plate 41 which may be of iron or other metal shown in Fig. 3. A spider-like washer 42 is provided to ensure electrical contact over a substantial area on the selenium film 40 of each rectifier member, a metallic finger 43 being mounted in contact with this washer, and each of the fingers 43 being connected to the transformer by leads as shown in Fig. 5.

The means for mounting one of the rectifier members in heat conductive relationship with the end wall, but electrically insulated therefrom, is shown in Fig. 4. The rectifier, spider 42 and connecting finger 43 are mounted on a bolt 44 and secured by a nut 45. The head of the bolt is insulated from the outside surface of the casing wall by an insulating washer 46, and a lock washer 47 on the bolt is insulated from the finger 43 by spacer washers 48 of insulating material. As shown in Fig. 4, an insulating bushing 49 is provided between the shank of the bolt 44 and the rectifier and its connecting parts.

In order to provide heat conductive contact between the rectifier and casing wall while at the same time electrically insulating these parts from each other the inner wall of the casing has thereon a coating of paint 50, as enamel. By providing this insulating paint layer and the insulating mounting as shown in Fig. 4, the rectifier member is in good heat exchange relationship with the casing but is electrically insulated therefrom and the casing need not be used as any part of the electrical circuit. This may be important in many cases where the casing is not used as the common return or ground in the system. For example, often the B- side of the voltage supply alone comprises the common return path and the casing is condenser coupled to the B- side of the line. The claimed construction permits optimum use of the casing as a heat conductor in contact with the rectifier while at the same time the rectifier is electrically insulated from the casing. The construction is completed as shown in Fig. 4 by the provision of a spacer washer 51 engaging the spider 42 and a metal washer 52 to provide a hard surface against which the lock washer 47 may bear.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A rectifier cooling arrangement of the character described for an electrical system, including: a metal casing for housing elements of said system, said casing having two substantially upright walls exposed to outer space and in direct thermal conductive contact with each other throughout substantially the entire extent of their juncture, a single layer rectifier mounted on only one of said walls and being electrically insulated therefrom, all portions of said rectifier being in good thermal conductive contact with the wall upon which it is mounted throughout substantially the entire surface of said wall and the surface of both of said walls providing a heat dissipating area greatly in excess of said area of said rectifier, the heat being dissipated from both of said walls directly to outer space by means of a combination of radiation and convection and conduction, and said casing having two substantially upright other walls exposed to outer space and in direct thermal conductive contact with each other throughout substantially the entire extent of their juncture, and a second single layer rectifier mounted on only one of said other walls and being electrically insulated therefrom, all portions of said last-mentioned rectifier being in good thermal conductive contact with the wall upon which it is mounted throughout substantially the entire surface of said wall and the surface of both of said other walls providing a heat dissipating area greatly in excess of said area of said last named rectifier, the heat being dissipated from both of said other walls directly to outer space by means of a combination of radiation and convection and conduction.

2. A rectifier cooling arrangement of the character described for an electrical system, including: a metal casing for housing elements of said system, said casing having two substantially upright walls exposed to outer space and in good thermal conductive contact with each other, and a rectifier mounted on only one of said walls, said rectifier having a large surface area and all portions of said rectifier being in good thermal conductive relation with the wall upon which it is mounted and the surface of both of said walls providing a heat dissipating area greatly in excess of said area of said rectifier, the heat being dissipated from both of said walls directly to outer space by means of a combination of radiation and convection and conduction.

3. A rectifier cooling arrangement of the character described for an electrical system, including: a metal casing for housing elements of said system, said casing having at least three substantially upright walls exposed to outer space and with one of said walls being in thermal conductive contact throughout a substantial area with each of the other two walls, and rectifier means having two alternatively operable single layer members each of which is mounted on a different one of said other walls, each member having a large area in direct thermal conductive contact with the wall upon which it is mounted, the surface of said walls providing a heat dissipating area greatly in excess of the area of said rectifiers, the heat being dissipated from each of said walls directly to outer space by means of a combination of radiation and convection and conduction.

RICHARD CLEARY CROSSLEY.

REFERENCES CITED

The following references are of record in the file of this patent:

UNITED STATES PATENTS

| Number | Name | Date |
|---|---|---|
| 2,215,667 | Sherman | Sept. 24, 1940 |
| 2,353,461 | Hamann | July 11, 1944 |
| 2,471,011 | Shapiro | May 24, 1949 |
| 2,485,450 | Kotterman | Oct. 18, 1949 |

FOREIGN PATENTS

| Number | Country | Date |
|---|---|---|
| 620,102 | Great Britain | Mar. 18, 1949 |